US008888295B2

(12) United States Patent
Edwards et al.

(10) Patent No.: US 8,888,295 B2
(45) Date of Patent: Nov. 18, 2014

(54) REFLECTIVE SURFACE TENSIONING AND CLEANING SYSTEM FOR PEPPER'S GHOST ILLUSION

(75) Inventors: Curtis Edwards, Clermont, FL (US); Thomas LaDuke, Orange, CA (US); Daniel Beaumont, Fullerton, CA (US)

(73) Assignee: Disney Enterprises, Inc., Burbank, CA (US)

( * ) Notice: Subject to any disclaimer, the term of this patent is extended or adjusted under 35 U.S.C. 154(b) by 400 days.

(21) Appl. No.: 13/539,804

(22) Filed: Jul. 2, 2012

(65) Prior Publication Data
US 2014/0002800 A1   Jan. 2, 2014

(51) Int. Cl.
*G03B 21/16* (2006.01)
(52) U.S. Cl.
CPC .................................. *G03B 21/16* (2013.01)
USPC ................. 353/60; 353/57; 353/58; 353/61
(58) Field of Classification Search
CPC ......... G03B 21/28; G03B 21/14; G03B 21/16
USPC ........... 353/51, 52, 53, 54, 55, 56, 57, 58, 59, 353/60, 61, 62
See application file for complete search history.

(56) References Cited

U.S. PATENT DOCUMENTS

| 6,844,993 | B2 * | 1/2005 | Fujimori et al. | 359/820 |
| 7,152,979 | B2 * | 12/2006 | Ellis et al. | 353/60 |
| 8,358,928 | B2 * | 1/2013 | Appel et al. | 396/535 |
| 2001/0026402 | A1 * | 10/2001 | Gerhard et al. | 359/731 |
| 2009/0273760 | A1 * | 11/2009 | Itoh | 353/38 |
| 2011/0141562 | A1 * | 6/2011 | Okazawa et al. | 359/507 |
| 2011/0164224 | A1 * | 7/2011 | Nishihata et al. | 353/31 |

* cited by examiner

*Primary Examiner* — Francis M Legasse, Jr.
*Assistant Examiner* — Bao-Luan Le
(74) *Attorney, Agent, or Firm* — Marsh Fischmann & Breyfogle LLP; Kent A. Lembke

(57) ABSTRACT

An apparatus projecting or displaying images to a viewer. The apparatus or Pepper's ghost system projects or displays an image stream onto a reflective element with a first surface receiving and reflecting a portion of light associated with the image stream to the viewer and a second surface opposite the first surface. The apparatus includes a cleaning assembly including an air supply providing a volume of flowing air and an ionizing mechanism for receiving the flowing air and outputting an ionized air flow. The ionized air flow is directed over the second surface of the reflective element. The reflective element is positioned at a non-vertical display angle. An outlet of the cleaning assembly is positioned adjacent an upper edge of the reflective element, and the ionized air flow is output from nozzles as laminar air flow with a flow rate chosen to mitigate dust collection on the upper second surface.

20 Claims, 5 Drawing Sheets

REFLECTIVE SURFACE TENSIONING AND CLEANING SYSTEM FOR PEPPER'S GHOST ILLUSION

BACKGROUND

1. Field of the Description

The present invention relates, in general, to projecting or displaying video/animated or still three dimensional (3D) images, and, more particularly, to autostereoscopy and autostereoscopic projection systems such as those adapted to display ghost or latent 3D images as provided as part of a Pepper's ghost illusion.

2. Relevant Background

There are numerous entertainment and other settings where it is desirable to create a unique visual display. For example, theme or amusement parks may include rides or walk-through attractions where guests (or "viewers") are entertained by a unique visual effect or illusion.

Pepper's ghost is an illusionary technique used by magicians, by ride or attraction designers, and others to produce a 3D illusion of a latent or ghost-like image. Using a simple piece of plate glass and special lighting techniques, Pepper's ghost systems can make objects appear and disappear within a scene or room. Generally, these systems include a main room or scene that is readily viewed by a guest or viewer and also include a hidden room that is not visible to the viewer. Both rooms may be identical in their physical structure including furniture and other objects except that the hidden room may include additional objects or characters such as a ghost. A large piece of glass or a half-silvered mirror is situated between the viewer and the scene at an angle such as about 45 degrees. When the main room is lit and the hidden room is darkened, the viewer only sees the main room as the hidden room does not reflect from the glass, which is itself hard to see as it typically extends across the entire view of the main room and is transparent (at least in part) to allow viewing of the room behind the glass (or reflective element).

Pepper's ghost becomes visible to the viewer when the entire hidden room or portions such as the ghost or other character are brightly lit. Since only a portion of the light cast upon the ghost or other objects in the hidden room is reflected from the glass, the reflected images appear as latent or ghostly images relative to the objects in the main room (e.g., the reflected images or images superimposed in the visible room may appear to float). The Pepper's ghost image is a 3D image that may be still or animation may be provided such as with animatronics or by placing a live actor in the hidden room. In some other implementations, the hidden room may be replaced by a projection assembly that projects a still or animated image onto a screen, such as a rear projection screen, and images on this projection screen (which is hidden from view from the viewer) are reflected from the glass or reflective element (or reflective surface of the reflective element which may be a half-silvered mirror or a flexible material with similar optical qualities to provide a reflective surface).

In amusement park and other settings, it is often desirable to permanently (or nearly so) install Pepper's ghost-based displays as part of attractions such as part of a haunted house. In such extended use implementations, sustainability and maintainability of the reflective element and its surfaces is very important for long term performance without degradation in the quality of the displayed or created Pepper's ghost (or reflected imagery). Hence, there remains a need for improved designs for systems or assemblies for providing the Pepper's ghost illusion that provide high quality imagery over long time periods that are easy to maintain and install.

SUMMARY

The present invention addresses the above problems by providing a Pepper's ghost system that combines a projection assembly with a reflector assembly. The reflector assembly includes a reflective element formed, typically, of plastic reflective material (e.g., with qualities allowing it to appear transparent to items behind it but also to reflect from a front or viewer-side surface exposed to the projection assembly). The Pepper's ghost system described is particularly well suited for displays above an audience or viewer such as when it may be useful to have the reflective element above the viewer and often at a display angle that is 15 to 60 degrees or more from vertical (i.e., the reflective element often is not vertical as is the case in many conventional Pepper's ghost systems). To facilitate overhead and non-vertical positioning of the reflective element/surface, the material used for the reflective element is often large flexible sheets of plastic reflective material. Hence, the Pepper's ghost system described herein is designed to address problems associated with use of such flexible plastic sheets or panes and with use of less-than-vertical display angles/arrangements for the reflective element.

The Pepper's ghost system is adapted to provide improved or more effective installation, maintenance, and sustainability or life of the system when installed and operated on an ongoing basis. The reflective element is formed from a flexible material or sheet of reflective material and preferably is tensioned to make the illusion or Pepper's ghost imagery display accurately or desirably. For example, it may be desirable that enough tension or tensile forces be applied to the reflective element to cause it to be planar or substantially planar (e.g., little or no sag across the reflective surface used to reflect the projected imagery from the projection assembly).

To this end, the reflector assembly includes a tensioning assembly that supports the reflective element at a desired display angle and tensions the sheet of reflective material to provide a planar reflective element. Proper tensioning (a tensile force great enough to make the sheet material taut across its surface) of the reflective surface is accomplished through the use of a first clamping device to hold one end of the material (such as the upper end or edge of the sheet or body of the material) in a fixed location and a tension adjuster to capture the opposite end of the material (such as the lower end or edge of the sheet/body of the material).

The tension adjuster of the tensioning assembly may be a threaded device such as a screw-type adjustment device, and a second clamping device in the tension adjuster may include two elongate jaws with a layer of compressive material (such as rubber, plastic, or the like) attached to or set in the jaws of the second clamp. The second end/edge of the reflective element is held between these two layers of "rubber" material and a compressive force is applied by tightening the two halves or jaws of the clamp to force the rubber material together (between which the second end of the reflective element is sandwiched). After clamping is complete, the tension adjuster, which engages the second clamping device, is operated to move the second clamping device and the second end of the reflective element away from the stationary first clamping device and first end of the reflective material. In this way, the tensioning assembly may be operated with one tool, such as a wrench, to properly set the tension on the reflective surface of the reflective element by rotating the threaded members (e.g., screws or the like) of the tensioning assembly to change the position of the second clamping device relative to the first clamping device.

With regard to show quality, a problem that arises is that the reflective surface is inherently prone to attracting dust. Dust tends to collect much more quickly when the reflective surface is not positioned vertically (such as at a display angle of 30 to 60 degrees or the like with 45 degrees used in some embodiments described herein). For example, the accumulation of dust on the upward or back surface (or either surface) of the reflective element lessens show quality through increased visibility of what preferably is a completely (or nearly so) transparent medium (i.e., the reflective element in a Pepper's ghost display system).

To mitigate this dust-based degradation in quality of the illusion, a surface cleaning assembly is included in the reflector assembly. The cleaning assembly may include or be a ionizing (or ion-concentrated) laminar airflow device that is mounted (such as at one of the two clamped ends of the reflective element) with an air discharge or outlet providing a laminar flow of air that has been passed over/through ionized bars. This ion-filled flow of air may be directed to flow over the upper or back surface (or another surface) of the reflective element. In this way, dust/dirt or other particles is caused to have the same polarity as the surface of the reflective element such that the dust is repelled from the reflective element instead of being attracted to or otherwise landing on this surface or side of the reflective element. An air knife or similar air flow control mechanism may be provided in the cleaning assembly to provide the sheet of laminar flow over the reflective element's surface. The cleaning assembly is useful for ensuring that no or less dust is attracted to and/or accumulates on the reflective surface via static charge.

The cleaning and tensioning assemblies provide significant enhancements over prior Pepper's ghost systems. In the past, tensioning of a flexible reflective surface had typically been accomplished by ratchet straps or through the use of heavy and maintenance-intensive pneumatic cylinders/systems. Typical cleaning involved various techniques for washing and wiping surface, which was difficult in many settings such as overhead configurations and often caused damage to the reflective elements including scratching of surfaces that affects transparency and reflection of the reflective element.

In contrast, use of a screw-type adjustment or tensioning assembly ensures repeatability and proper tensioning by tightening a threaded member (or joint/coupling) such as to a predetermined tightness (e.g., a measurable torque value or range on each threaded member/joint) to achieve a desired tensile force being applied to the reflective element. The ionizing laminar airflow device (or cleaning assembly) reduces or even eliminates the need for manual maintenance and periodic cleaning by providing limiting the amount of dust landing on the reflective surface (e.g., the reflective element can be considered "self-cleaning" or being proactively cleaned or treated in an ongoing manner to avoid changes to the optical characteristics of the reflective element). By reducing or eliminating contact-based cleaning, the material life of the reflective element is extended to limit the need for its periodic replacement (which was a concern with prior systems).

More particularly, an apparatus is provided for projecting or displaying images to a viewer. The apparatus (e.g., a Pepper's ghost system) includes a projector assembly projecting an image stream and a reflective element with a first surface receiving and reflecting a portion of light associated with the image stream to the viewer and a second surface opposite the first surface. The apparatus further includes a cleaning assembly including an air supply providing a volume of flowing air and an ionizing mechanism for receiving the flowing air and outputting an ionized air flow. In some embodiments, the ionized air flow is directed to flow over the second surface of the reflective element. The reflective element is positioned at a display angle, measured from vertical to the second surface, that is at least 15 degrees such as 30 to 60 degrees or the like. In some cases, an outlet of the cleaning assembly is positioned adjacent an upper edge of the reflective element, and the ionized air flow is output from one or more nozzles as laminar air flow with a flow rate of at least about 2 scfm.

In some preferred embodiments, the reflective element comprises a flexible film and further is made up of a tensioning assembly including: (a) a first clamp retaining the flexible film along a first edge; (b) a second clamp retaining the flexible film along a second edge opposite the first edge; and (c) a tension adjuster engaging the second clamp and selectively moving the second clamp a distance away from the first clamp to apply a tensile force to the flexible film along the second edge. In such embodiments, the tension adjuster may be connected to the second clamp via a plurality of spaced apart threaded members, such that the tensile force is applied by applying a torque to each of the threaded members.

In some such embodiments, the second clamp includes a pair of elongated, planar plates and contact pads provided on facing surfaces of the plates, with the contact pads formed of a compressible material with a high coefficient of friction such as a neoprene. Further, in some useful implementations, the second edge is received in the second clamp between the contact pads, and the plates are forced together to compress the contact pads and retain the second edge such that the film is tensioned without requiring holes or puncturing of the material/film.

DETAILED DESCRIPTION

Briefly, a Pepper's ghost system is provided that is adapted to facilitate positioning a flexible reflective element in a non-vertical position, e.g., an angle of 30 to 60 degrees from vertical. Use of a flexible film such as a large sheet of polyethylene terephthalate (PET) film as the beam splitter or reflective element of the Pepper's ghost system requires that the reflective element be tensioned so as to provide a substantially planar reflective surface (e.g., the bottom surface of the reflective element). To this end, the Pepper's ghost system provides a reflector system with a tensioning assembly that is adapted to allow effective and easily repeated tensioning by applying a tensile force along one edge or side of the reflective element (e.g., threaded movement of a clamp holding the edge/side without puncturing the material of the reflective element).

Positioning the reflective element at an angle makes dust mitigation much more important, and the Pepper's ghost system includes a cleaning assembly (or dust mitigation assembly) within the reflector assembly to limit the amount of dust that collects on the top surface of the reflective element (i.e., the surface opposite the reflective surface upon which images are projected from a projection assembly). In one embodiment, the cleaning assembly includes an ionizing mechanism and an air supply (air compressor or the like). Air is forced to pass over or through the ionizing mechanism and flow over the top surface of the angled (and tensioned) film or reflective element so as to charge dust particles so that the dust has a charge opposite the reflective element (or its material providing the top surface). In this way, the dust is repelled from the reflective element and the air flow (e.g., exiting an air knife or other outlet adjacent the top surface to provide laminar or other flow states over the top surface) carries the repelled dust away from the reflective element. In this way, periodic cleaning is not typically required in the Pepper's ghost system to retain a high quality ghost image as the reflective element remains nearly transparent to an observer or viewer of the illusion.

Figure 1:
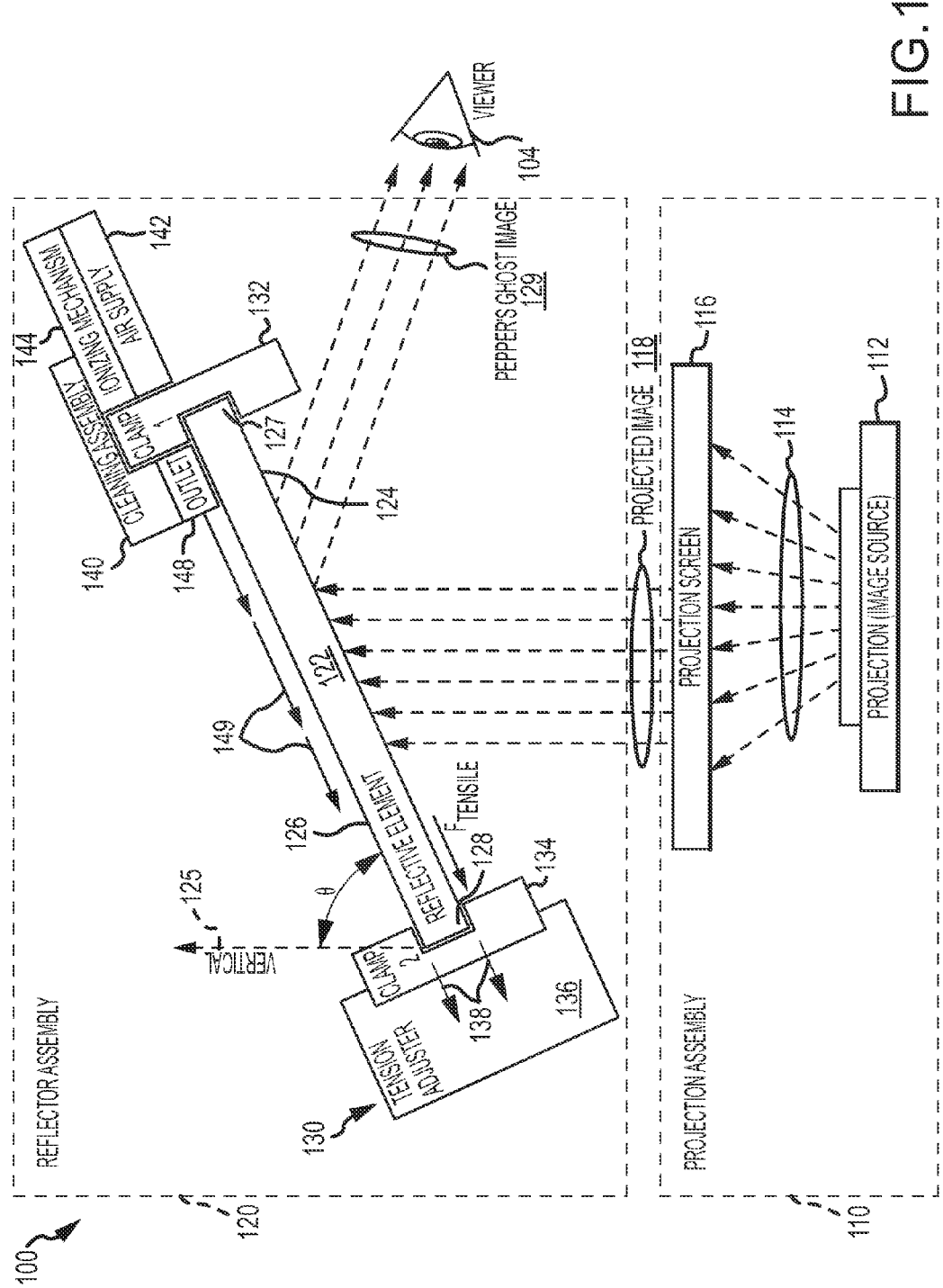
FIG. 1 illustrates a functional block illustrating a Pepper's ghost system of one embodiment of the description showing use of a flexible reflective element positioned at a display angle off of vertical.

FIG. 1 provides a functional block drawing or schematic illustration of an exemplary Pepper's ghost system 100. As shown, the system 100 includes a projection assembly 110 that works together with a reflector assembly 120 to produce a Pepper's ghost image 129 visible or viewed by a viewer 104 observing the system 100 during its operation. The projection assembly 110 is shown in very simple form to include a projector or image source 112 projecting (or displaying) an image 114 such as a still or video/animated image stream onto a projection screen 116. The illustrated projection assembly 110 uses a rear projection (RP) screen 116 but other embodiments may use many different techniques to output a projected (or displayed) image 118 directed toward or into the reflector assembly 120.

In some cases, a mirror is provided to reflect the projected image 118 onto the reflective element 122 of the reflector assembly 120. Also, the projection assembly 110 may include one or more of the cleaning or dust mitigation assemblies such as cleaning assembly 140 to mitigate dust on non-vertical surfaces such as mirror, glass, or projection surfaces of the projection assembly 110. In other words, the dust mitigation techniques described herein may be applied to any surface in the optical stream between the projector 112 and the viewer 104 to control dust/dirt buildup on such surfaces and retain optical quality and limit (or eliminate) routine maintenance of the optic surfaces.

The reflector assembly 120 includes a reflector element 122 such as a sheet of PET or similar material that is transparent to some light (such as when viewed directly by the viewer 104) but also reflects light received at an angle such as 30 to 60 degrees as shown with light of projected image 118. The projected image 118 light strikes a first or bottom surface (or reflective surface) 124 and is reflected as a Pepper's ghost image 129 to the viewer 104 (e.g., a portion of the light of image 118 is reflected in image 129 such as about 50 percent).

Instead of being arranged to be vertical as shown at vertical plane 125 the reflective element 122 is positioned at a display angle, $\theta$, from vertical that typically is in the range of 15 to 75 degrees and more typically between 30 and 60 degrees with 45 degrees used for some implementations of the reflector assembly 120. As a result, the reflective element 122 has a second or top surface (or surface opposite the reflective surface 124) 126 that is much more prone to attract and collect dust, e.g., become dirty, which is undesirable as it allows the reflective element 122 to be more readily detected by the viewer 104.

Hence, it is desirable for the reflector assembly 120 to be adapted for providing proper tensioning of the reflective element 122 and also to mitigate dust collection by the top surface 126. Regarding tensioning, the reflective element 122 may be formed of a rigid piece of plastic or glass or the like for which cleaning assembly 140 may be used to provided dust mitigation in some limited embodiments. However, the reflective element 122 often will be a relatively large element such as 4 to 8 feet or more on a side such that use of glass or similar materials in an overhead location relative to viewer 104 may be undesirable for safety and other reasons. In such embodiments, the reflective element 122 may be provided using a sheet of flexible and substantially transparent material such as with use of film of PET, Mylar (or BoPET), or transmissive and reflective material. In these cases, it is desirable for the reflective surface 122 to have a reflective surface 124 that is planar or substantially so, which is achieved by tensioning the reflective element 122.

In this regard, the reflector assembly 120 is shown to include a tensioning assembly 130 for positioning the reflective element 122 at the display angle and also for tensioning the element 122 or making surface 124 planar to reflect the projected image 118 to viewer 104 as ghost image 129. The tensioning assembly 130 includes a first clamp 132 that functions to capture or clasp a first or upper edge/side 127 of the reflective element 122 and to hold this end rigidly in a fixed position. The clamp 132 may include a layer or pad(s) formed of a high coefficient of friction material such as a rubber or other compressible material such that these attachment pads/layers contact/abut and retain the first edge/side 127 without requiring the material of element 122 to be punctured or pierced, which can cause ripping or other problems.

The tensioning assembly 130 further includes a second clamp 134 that may be configured similarly to the first clamp 132 to capture and retain a second or lower edge/side 128 of the reflective element 122 (opposite the first edge 127). The tensioning assembly 130 also includes a tension adjuster or application mechanism 136. The tension adjuster 136 is adapted to support the second or lower clamp 134 and also to allow the clamp 134 to be moved as shown with arrows 138 in a controllable and uniform manner along the length of the clamp 134 or along the side/edge 128 of reflective element 122 to apply a tensile force, $F_{Tensile}$, to the reflective element 122.

For example, the tension adjuster 136 may include a C-channel or the like that engages the clamp 134 with two or more threaded members or screws to allow the clamp 134 to be moved 138 by tightening or turning the threaded members or screws. In this way, the amount of tensile force, $F_{Tensile}$, and tensioning of the reflective surface 122 can be readily and accurately controlled (e.g., by torque applied to and measured at each tensioning member/screw (e.g., with a torque wrench a worker can apply a specified torque to obtain a uniform and desired amount of tensioning of the reflective element 122).

To mitigate dust on the second or top surface 126 of the reflective element 122, the reflector assembly 120 includes a cleaning assembly 140. The assembly 140 includes an air supply 142 such as an air compressor for providing a pressurize supply of air. The assembly 140 further includes an outlet 148 positioned adjacent or proximate to the first or upper edge/side 127 of the reflective element 122 and configured to discharge a flow of air 149 onto the top or second surface 126 of the reflective element 122. The outlet 148 may take the form of an air knife or a nozzle extending the width or length of side 127 for providing a laminar (or relatively low turbulence) flow 149, such that the air flows over substantially the entire surface 126 in a uniform manner without eddies or areas of low flow where dust may gather.

Significantly, the cleaning assembly 140 further includes an ionizing mechanism 144 between the air supply 142 and the air outlet 148 such that the air flow 149 acts to charge particles so as to avoid static on surface 126. For example, the ionizing mechanism may take the form of an ionizing bar(s) over which the compressed air is caused to flow to provide the flow 149 of air with static eliminating ions, with relatively uniform flows of 3 to 5 SCFM typically being adequate to mitigate dust. In one embodiment, the cleaning assembly 140 includes a Super Ion Air Knife distributed by EXAIR® Corporation, Cincinnati, Ohio, USA but other similar mechanisms with ionizing bars and controlled air flow may be used to provide the cleaning assembly 140.

The ionizing mechanism 144 may include an electrically powered ionizing bar that fills the air from air supply 142 with positive and negative charges, and, then, the ionized airstream 149 delivers these static-eliminating ions to the surface 126 to neutralize the surface 126 and clean dust and other particles from the reflective element 122. In other words, the cleaning assembly, acts to eliminate static cling on the film surface 126 that can attract dust while the flowing air 149 also acts to push or carry away such particles/dust and maintain the desired optical qualities of the reflective element 122 (e.g., to retain the transparency of element 122).

Figure 2:
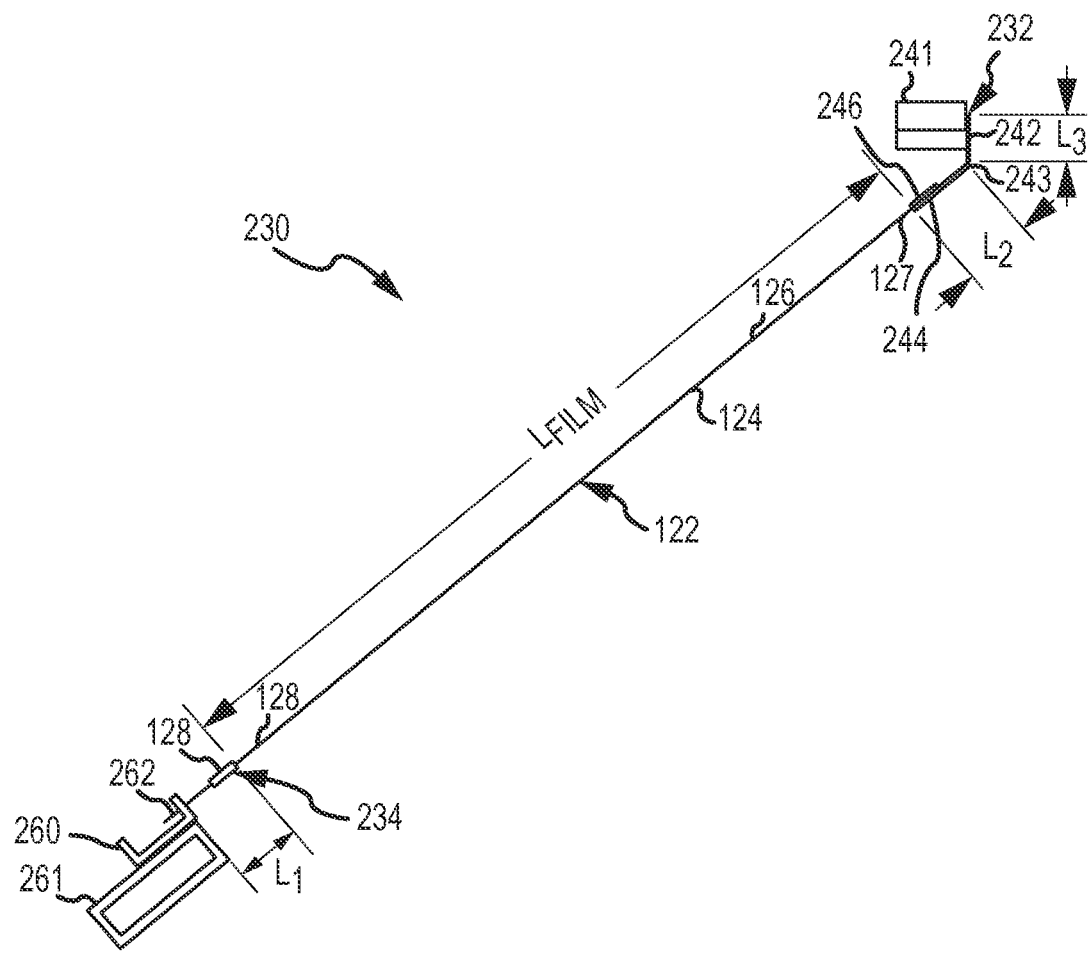
FIG. 2 is a side or end view of a tensioning assembly (or film attachment system) such as may be used in the Pepper's ghost system of FIG. 1 to support and tension a reflective element provided by a sheet of flexible material.

FIG. 2 illustrates a side or end view of a tensioning assembly (or film attachment system) 230, such as may be used in the Pepper's ghost system of FIG. 1 to support and tension a reflective element 122 provided by a sheet or film of flexible material. As shown in FIG. 1, the reflective element 122 includes a bottom or first surface 124 that may be used to receive a projected image from a projection assembly and to reflect at least a portion of this light to a viewer while also allowing the user to see through the element 122 (e.g., when not projected upon and/or when light is provided behind element 122). The reflective element 122 also includes a top or second surface 126 opposite the first surface 124, and the reflective element 122 may be supported within the tensioning assembly 230 to be at a display angle of 30 to 60 degrees or another useful, non-vertical angle (which is why dust mitigation is preferably provided for surface 126). Also, the reflective element 122 is preferably tensioned such that reflective or bottom surfaces 124 is planar.

To this end, the tensioning assembly 230 includes a top or first screen attachment (or clamp) 232. The top screen attachment 232 includes a first planar and elongated member 242 (e.g., a rectangular metal plate) extending along the top or first edge/side 127 of the reflective element 122. The first planar member 242 is rigidly affixed or mounted to a support member (e.g., square tubing attached to a building structure or mounting frame) 241. The top screen attachment 232 also includes a second planar and elongated member 244 extending along the first or top edge 127 of the film 122. Again, this may be a rectangular metal plate, and the first and second planar members 242, 244 are pivotally connected to each other via hinge 243. In this manner, the display angle (e.g., 45 degrees or the like) of the film or reflective element 122 can be adjusted or set by the location of the bottom or second screen attachment 234 relative to the top or first screen attachment 232, with the second planar member 244 being pivoted or rotated to be in the plane of the bottom screen attachment 234. The sizes of the members 242, 244 may be varied to practice the assembly 230 such as with lengths/heights, $L_3$ and $L_2$ ranging significantly (with values of 4 and 6 inches used in one embodiment).

The reflective element 122 is captured and retained by the top screen attachment 232 without puncturing by used of an upper plate 246 that is pressed against or toward the planar member 244. Pads/layers of high coefficient of friction material and/or of compressible material may be provided on the inner surfaces of the member 244 and plate 246 and the first or upper edge/side 127 of the reflective element 122 may be sandwiched between the member 244 and plate 246 with the softer and/or higher coefficient of friction material abutting or contacting the surfaces 124, 126 of the edge/side 127. By compressing these pad/layers against the film 122, the edge/side 127 can be effectively held by the top screen attachment 232 while tensile forces are applied without destructing or damaging the film 122 (e.g., when the film 122 is tensioned or stretched to make surface 124 planar or more planar).

While not shown in FIG. 2, a cleaning assembly (or its outlet nozzle) would typically be mounted on or proximate to the top screen attachment 232 to cause air (with a concentrated amount of positive and/or negative ions) to flow over the upper surface 126, such as laminar flow output after flowing over an ionizing bar or similar dust and static mitigation device.

The lower or second edge or side 128 of the film 122 is captured in a manner similar to that of edge/side 127 by a bottom screen attachment 234 (e.g., with two plates that are pressed together to compress pads/layers of softer/compressible material such as neoprene or rubber against the surfaces 124, 126 of the edge/side 127). The bottom screen attachment 234 is connected or linked to a C-channel 260 (e.g., a metal channel that may be a C-channel or other cross design such an L-beam or the like) that is mounted to a base or support 216, which in turn is attached to building structure or a support frame (not shown) such that the reflective element 122 is positioned at a desired location relative to a projection assembly (not shown) such as at some height above viewers/audience members.

The distance, $L_1$, between the inner wall of the C-channel 260 and the exposed edge/side 128 of the reflective element 122 may be varied to practice the invention and is varied or adjusted to tension the element 122. For example, the distance, $L_1$, may initially be 6 inches and be shortened to 5 to 5.5 inches during tensioning to make the film 122 taut or reflective surface 124 planar. To this end, the connection between the C-channel 260 and the bottom screen attachment 234 is via a plurality of threaded connectors or members 262, which may be provided in a space-apart manner along the length of the C-channel 260 (e.g., every 6 to 12 inches or the like). The connection is configured such that when a torque is applied to the connectors 262 the distance, $L_1$, is decreased and a greater tensile force is applied to the reflective element 122 along the edge/side 128. The tensile force can be applied uniformly by applying the same torque to each connector 262 (tightening each connector 262 the same amount or turning each screw-type element the same number of turns or the like).

Figure 3:
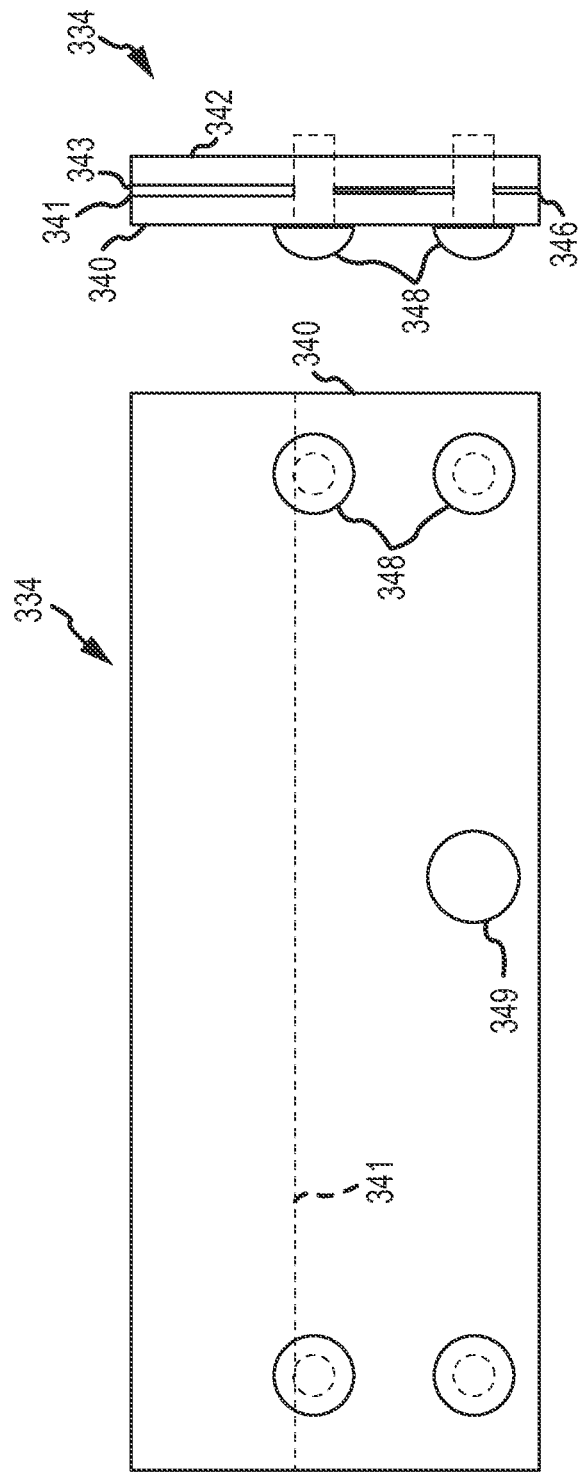
FIGS. 3A and 3B illustrate a front view and a right side or end view, respectively, of the first clamp or bottom screen attachment that may be used in the systems of FIGS. 1 and 2 to clasp or grip the lower edge/side of the flexible reflective element (e.g., a sheet of PET or BoPET film or the like) in a non-destructive manner.

FIGS. 3A and 3B illustrate front and right side/end views, respectively, of second clamp or bottom screen attachment 334 that may be used for the attachment 234 of FIG. 2 or the second clamp 134 of FIG. 1 to tightly grip or restrain the lower edge 128 of a reflective element or film (e.g., film 122 of FIGS. 1 and 2) without requiring punching of holes or puncturing of the reflective element. Further, the screen attachment 334 is adapted for uniform application of tensile forces or tensioning of the captured reflective element. While not shown, the first clamp 132 and top screen attachment 232 may be designed to capture a film in a similar manner as shown for bottom screen attachment 334 (e.g., by sandwiching the film between two compressive pads 341, 343).

As shown in FIGS. 3A and 3B, the screen attachment 334 includes a first or front plate (or planar member) 340 and a matching or paired second or back plate (or planar member) 342. These may be formed from plates of metal or from bar stock (e.g., one embodiment uses aluminum bar stock that is 3/16 inches thick, 2.5 inches wide, and 11 feet in length (with length picked to match the length of the lower edge/side of the film/screen being retained/captured by the screen attachment 334). The width or depth of the plates 340, 342 is chosen to provide adequate mating or contact surface area with the received edge/side of the reflective element such as 1 to 2 inches of mating/contact depth.

To this end, the screen attachment 334 includes a pair of contact pads 341, 343 attached to the inner or facing surfaces for the plates 340, 342 on the top end or end used to receive the edge/side of the reflective element or screen (not shown in FIGS. 3A and 3B). The pads 341, 343 typically extend the length of the plates 340, 342 and are formed of a material that has a high coefficient of friction to better hold or retain the side/edge of the screen sandwiched between the pads 341, 343 during use of the screen attachment 334. Further, it is typically preferable that the pads 341, 343 be formed of a material that is compressible when the two plates 340, 342 are forced together or toward each other by tightening of a series of fasteners (e.g., screws) 348 provided in a spaced apart manner along the length of the plates 340, 342. The fasteners 348 may be provided in pairs as shown that are spaced apart a predefined distance to apply a relatively uniform compressive force onto the pads 341, 343 to retain a received film/screen, such as 4 to 8 inches spacing with 6-inch spacing used in one embodiment.

A shim 346 (e.g., an aluminum shim of 0.02 to 0.1 inches or the like) may be provided at the other end of the plates 340, 342 that is about the thickness of the pads 341, 343 and captured upon tightening of the fasteners 348 to compress the pads 341, 343 and rigidly retain the screen/reflective element without damage to the material of the screen. In one embodiment, the pads 341, 343 are provided with 1-inch by 0.0625-inch neoprene (which may be selected to meet ASTM D1056 2A2 or similar standards), and this provides a 1-inch contact depth for a received side/edge of a reflective element. The compressive material may provide a firmness of 20 to 30 percent deflection (e.g., 25 percent deflection), a softness of 5 to 10 psi, a density of 4 to 8 ibs/cubic foot, and/or be selected to provide other useful physical characteristics.

FIG. 3A also shows that the plates 340, 342 include a hole 349, which may be repeated along the lengths of the plates 340, 342. In one embodiment, tensioning of a reflective element or screen pinched between the pads 341, 343 of the attachment 334 is provided by placing a clevis or similar component in each hole 349. As shown in FIG. 2, such a clevis then may be attached to a threaded member 262 and to a support member 260 such as a C-channel or the like. Then, during operation of the attachment 334, tensioning may be provided by turning or applying a torque on each threaded member so as to cause the clevis in holes 349 to move closer to the support member 260. The torque applied can be measured/gauged so was to be relatively uniform along the length of the plates 340, 342, and the holes 349 may be spaced apart in an equidistant manner (such as 4 to 8 inches apart or the like) to apply the tensile force in a uniform manner to the edge/side of the received reflective film.

Figure 4:
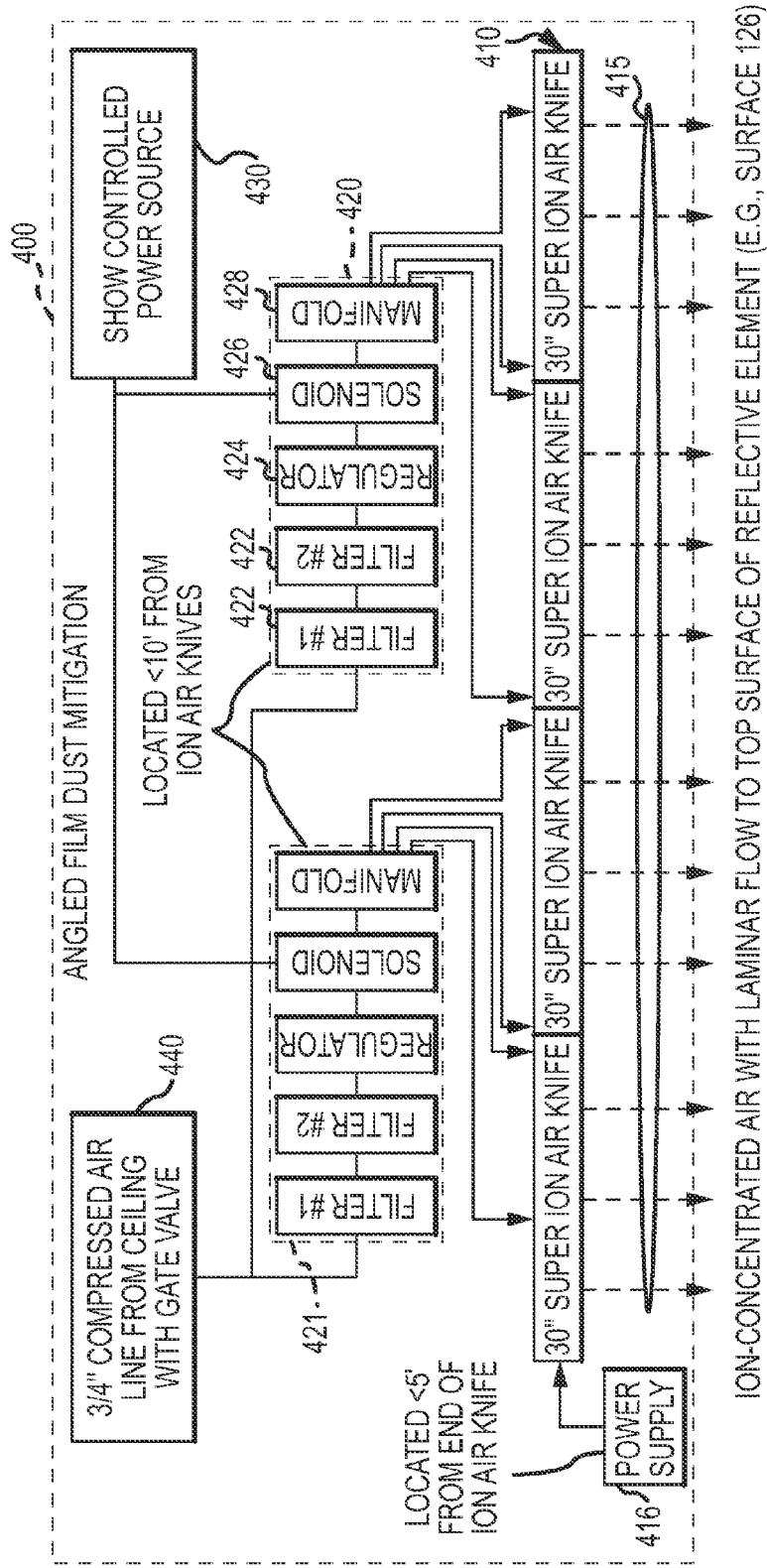
FIG. 4 is a functional block or schematic drawing of an exemplary cleaning assembly or dust mitigation system for use in a Pepper's ghost system to mitigate static and/or dust on upper surfaces of angled (or non-vertical) reflective elements (or other optical components such as mirrors, glass panels, or the like)

FIG. 4 is a functional block or schematic drawing of an exemplary cleaning assembly or dust mitigation system 400 for use in a Pepper's ghost system, such as for cleaning assembly 140 of system 100 of FIG. 1. The dust mitigation assembly 400 is configured to operate so as to mitigate static and/or prevent dust from collecting on an upper surface of an angled (or non-vertical) reflective element such as top surface 126 of reflective element 122 in system 100 of FIG. 1. In other cases, though, such a cleaning system 400 may be used with other angled or non-vertical optical components such as mirrors, glass panels, or the like provided in a Pepper's ghost or other optical/projection system (not shown but understood by those skilled in the art).

As shown, the dust mitigation assembly 400 includes one to four or more ionizing mechanisms 410 that operate to output a flow of air 415 that contains a concentration or quantity of positive and/or negative ions that are useful for charging dust particles to repel the dust particles from a surface (such as surface 126 of reflective element 122 of FIG. 1). The output air 415 may be provided from nozzles so as to be relatively laminar and at adequate flow rates to minimize risks of dust collection on surfaces. Further, the flow 415 preferably is provided along an entire edge or side of an angled reflective element such as along the edge/side 127 of element 122.

To this end, the ionizing mechanisms 410 are selected to have a width (or nozzle outlet width) that is about the same or greater than the width of the nearby reflective element. As discussed above and shown in FIG. 4, the ionizing mechanisms 410 may be provided as off-the-shelf products such with a number of 30-inch Super Ion Air Knives available from EXAIR® Corporation or similar product designed to provide ionized air flow. A power supply 416 is provided that may use local power (e.g., 110 VAC) to operate the ionizing mechanisms 410 in an ongoing (or periodic) manner to provide ionized air flow 415.

The dust mitigation assembly 400 also includes air inlet assemblies 420, 421 to provide an input air supply to the ionizing mechanism(s) 410. As shown, an air inlet assembly 410 may include one or more air filters 422, 424, a regulator 424, a solenoid or inlet valve 426, and an outlet manifold 428. The solenoid 426 may be controlled to operate in a selective manner with a controlled power source 430 (e.g., a show-controlled power source operating in conjunction with use of a Pepper's ghost system). The dust mitigation assembly 400 further includes an air supply 440 that may provide compressed (or pressurized) air to the inlet air assemblies 420, 421 for supply to ionizing mechanisms 410 to provide a desired flow rate of ionized air 415 onto an angled surface being cleaned with the assembly 400.

Figure 5:
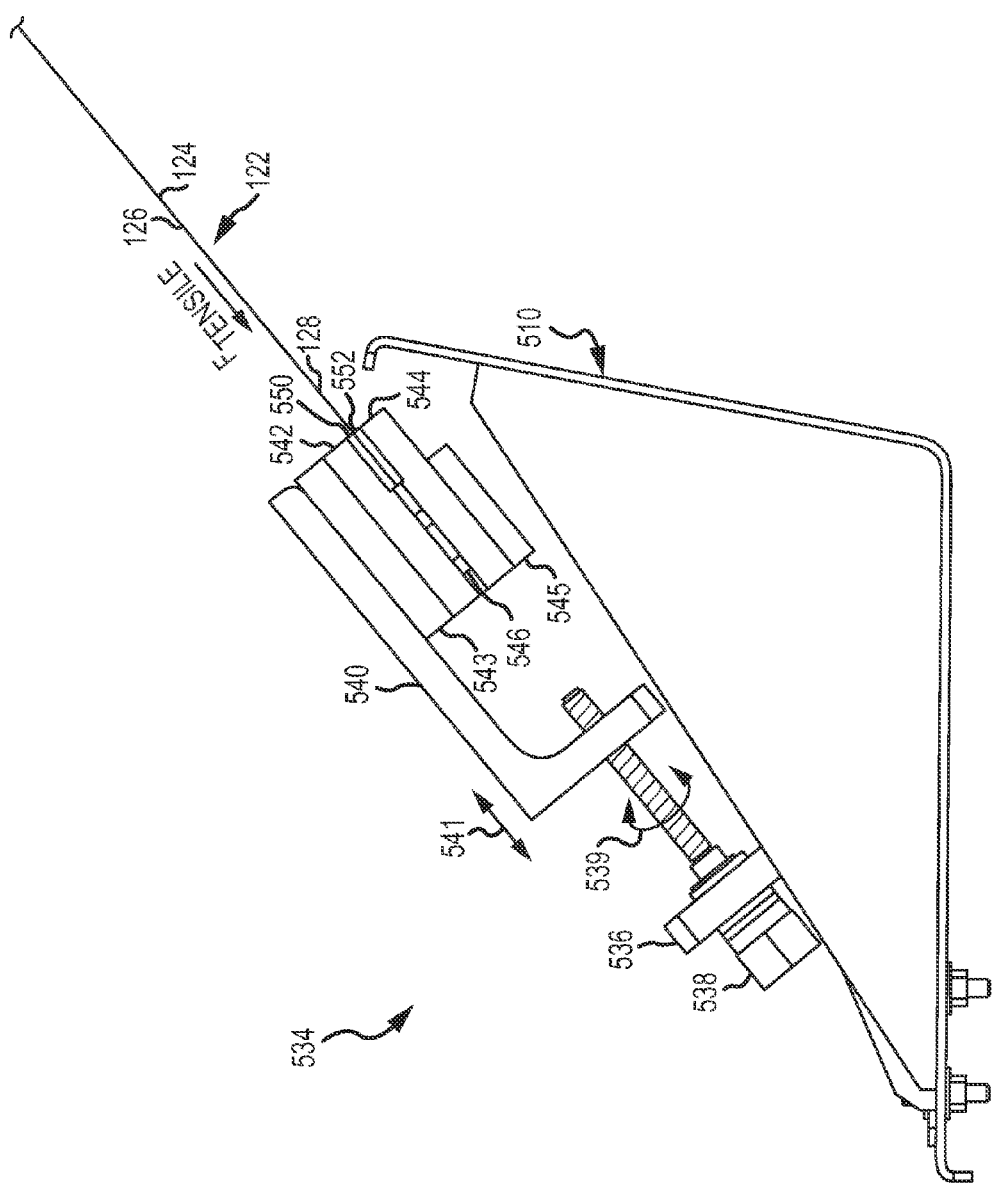
FIG. 5 is side view of a tensioning assembly that may be used in Pepper's ghost system using a sheet or film of flexible material for reflective element such as the system of FIG. 1.

FIG. 5 is side view of a tensioning assembly 530 that may be used in Pepper's ghost system using a sheet or film of flexible material for reflective element such as the system of FIG. 1. The tensioning assembly 530 includes a clamp or clamping assembly 534 (e.g., the bottom or second clamp 134 of FIG. 1) and a tension adjuster 535 (e.g., the tension adjuster 136 of FIG. 1). The clamp 534 includes first and second plates (or planar jaws) 542, 544, and contact pads 550, 552 are attached to the inner surfaces of these plates at one end (or the outer end). During use as shown, an edge/side 128 of a reflective element or film 122 is positioned or sandwiched between the pads 550, 552. Outer plates/members 543, 545 abut the plates/jaws 542, 544 and force the plates 542, 544 and sandwiched pads 550, 552 together in response to tightening of threaded coupling members or connectors 546 extending between through the components of the clamp 534.

The connectors 546 also affix the clamp 534 and, hence, the edge/side 128 of the film 122 to support 540 (e.g., an L-beam or the like). The tension adjuster 535 is affixed to mounting element 510 via bearing support 536. The support 536 provides a bearing surface for a threaded member or connector 538, which can be turned or torque as shown at 539. Due to the threaded connection with a wall of the support 540, rotation 539 of the threaded connector 538 causes the support 540 to move in or out as shown with arrow 541. This movement 541 is useful for applying a tensile force, $F_{Tensile}$, upon the captured film or reflective element 122 such as to make the bottom or reflective surface 124 planar or nearly so.

A plurality of tension adjusters 535 may be provided in a spaced-apart manner (e.g., every 4 to 8 inches or the like) along the length of the support 540 so as to allow uniform movement 541 of the support by applying a uniform torque to connector 538, which provides a substantially uniform tensile force, $F_{Tensile}$, to edge/side 128 of reflective element 122. The use of the compressive pads (e.g., rubber, neoprene, or similar materials) 550, 552 allows the film 122 to be firmly held in place in the clamp 534 without requiring holes or slots to be cut into the edge/side 128.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An apparatus for projecting or displaying images to a viewer, comprising:
    a projector assembly projecting an image stream;
    a reflective element with a first surface receiving and reflecting a portion of light associated with the image stream to the viewer and a second surface opposite the first surface; and
    a cleaning assembly including an air supply providing a volume of flowing air and an ionizing mechanism for receiving the flowing air and outputting an ionized air flow, wherein the ionized air flow is directed to flow over the second surface of the reflective element.

2. The apparatus of claim 1, wherein the reflective element is positioned at a display angle measured from vertical to the second surface that is at least 15 degrees.

3. The apparatus of claim 2, wherein an outlet of the cleaning assembly is positioned adjacent an upper edge of the reflective element.

4. The apparatus of claim 2, wherein the ionized air flow is output from one or more nozzles as laminar air flow with a flow rate of at least about 2 scfm.

5. The apparatus of claim 1, wherein the reflective element comprises a flexible film and further comprising a tensioning assembly including:
    a first clamp retaining the flexible film along a first edge;
    a second clamp retaining the flexible film along a second edge opposite the first edge; and
    a tension adjuster engaging the second clamp and selectively moving the second clamp a distance away from the first clamp to apply a tensile force to the flexible film along the second edge.

6. The apparatus of claim 5, wherein the tension adjuster is connected to the second clamp via a plurality of spaced apart threaded members, whereby the tensile force is applied by applying a torque to each of the threaded members.

7. The apparatus of claim 5, wherein the second clamp comprises a pair of elongated, planar plates and contact pads provided on facing surfaces of the plates, the contact pads formed of a compressible material with a high coefficient of friction.

8. The apparatus of claim 7, wherein the second edge is received in the second clamp between the contact pads and wherein the plates are forced together to compress the contact pads and retain the second edge.

9. A Pepper's ghost system, comprising:
    a reflective element with a first surface receiving and reflecting a portion of light associated with the image stream to the viewer and a second surface opposite the first surface wherein the reflective element comprises a flexible film of transmissive and reflective material;
    a cleaning assembly including an air supply providing a volume of flowing air and an ionizing mechanism for receiving the flowing air and outputting an ionized air flow, wherein the ionized air flow is directed to flow over the second surface of the reflective element; and
    a tensioning assembly including:
        a first clamp retaining the flexible film along a first edge;
        a second clamp retaining the flexible film along a second edge opposite the first edge; and
        a tension adjuster engaging the second clamp and selectively moving the second clamp a distance away from the first clamp to apply a tensile force to the flexible film along the second edge.

10. The system of claim 9, wherein the tension adjuster is connected to the second clamp via a plurality of spaced apart threaded members, whereby the tensile force is applied by applying a torque to each of the threaded members.

11. The system of claim 9, wherein the second clamp comprises a pair of elongated, planar plates and contact pads provided on facing surfaces of the plates, the contact pads formed of a compressible material with a high coefficient of friction.

12. The system of claim 11, wherein the second edge is received in the second clamp between the contact pads and wherein the plates are forced together to compress the contact pads and retain the second edge.

13. The system of claim 9, wherein the reflective element is positioned at a display angle measured from vertical to the second surface that is at least 30 degrees.

14. The system of claim 13, wherein an outlet of the cleaning assembly is positioned adjacent an upper edge of the reflective element.

15. The apparatus of claim 13, wherein the ionized air flow is output from one or more nozzles as laminar air flow with a flow rate of at least about 2 scfm.

16. A self-cleaning Pepper's ghost apparatus, comprising:
    a projector projecting an image stream;
    a film of transmissive and reflective material with a first surface receiving light associated with the image stream and a second surface opposite the first surface, wherein the film is supported at a non-vertical display angle;
    an air supply providing a volume of flowing air; and
    an ionizing mechanism for receiving the flowing air and outputting an ionized air flow with a plurality of ions, wherein the ionized air flow is directed to flow over the second surface of the reflective element.

17. The apparatus of claim 16, wherein the ionized air flow is output at a location adjacent an upper edge of the reflective element.

18. The apparatus of claim 16, wherein the film is flexible and further comprising a tensioning assembly including:
- a top screen attachment retaining the flexible film along an upper edge;
- a bottom screen attachment retaining the flexible film along a lower edge opposite the upper edge; and
- a tension adjuster engaging the bottom screen attachment and selectively moving the bottom screen attachment in a direction away from the first clamp to apply a tensile force to the flexible film along the lower edge.

19. The apparatus of claim 18, wherein the tension adjuster is connected to the second clamp via a plurality of spaced apart threaded members, whereby the tensile force is applied by applying a torque to each of the threaded members.

20. The apparatus of claim 18, wherein the second clamp comprises a pair of elongated, planar plates and contact pads provided on facing surfaces of the plates, the contact pads formed of a compressible material with a high coefficient of friction.

* * * * *